Feb. 22, 1955 S. DE MATTHAEIS, JR Re. 23,949

COLLAPSIBLE TABLE FOR TOY TRAINS

Original Filed Dec. 12, 1950 2 Sheets-Sheet 1

INVENTOR
Serafino de Matthaeis
BY
Herbert H. Fairbanks
ATTORNEY

Feb. 22, 1955 S. DE MATTHAEIS, JR Re. 23,949

COLLAPSIBLE TABLE FOR TOY TRAINS

Original Filed Dec. 12, 1950 2 Sheets-Sheet 2

INVENTOR
Serafino de Matthaeis
BY
Herbert S. Fairbanks
ATTORNEY

United States Patent Office

Re. 23,949

Reissued Feb. 22, 1955

23,949

COLLAPSIBLE TABLE FOR TOY TRAINS

Serafino De Matthaeis, Jr., Philadelphia, Pa.

Original No. 2,618,437, dated November 18, 1952, Serial No. 200,335, December 12, 1950. Application for reissue June 19, 1953, Serial No. 362,979

3 Claims. (Cl. 238—10)

Matter enclosed in heavy brackets [ ] appears in the original patent but forms no part of this reissue specification; matter printed in italics indicates the additions made by reissue.

The object of this invention is to devise a novel collapsible track unit for toy trains which will enable one to fold the unit into a relatively small package with all of the component parts in the package so that the unit will occupy a minimum space for storage.

A further object of the invention is to devise a novel construction and arrangement of tables which can be selectively connected to provide a desired form of tracks and which are adapted to receive the train and electric controlling parts such as switches and transformer and electrical connections.

A further object of the invention is to provide novel means for locking together adjacent ends of tracks on the different tables.

With the foregoing and other objects in view as will hereinafter clearly appear, my invention comprehends a novel collapsible track unit.

It further comprehends a novel track unit having a novel arrangement and construction of tables; novel means for hinging them together; and novel means for providing the proper electrical connections between sections of track.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized and the invention is not limited to the exact arrangement and organization of these instrumentalities except by the scope of the appended claims.

Similar numerals of reference indicate corresponding parts.

Figure 1:
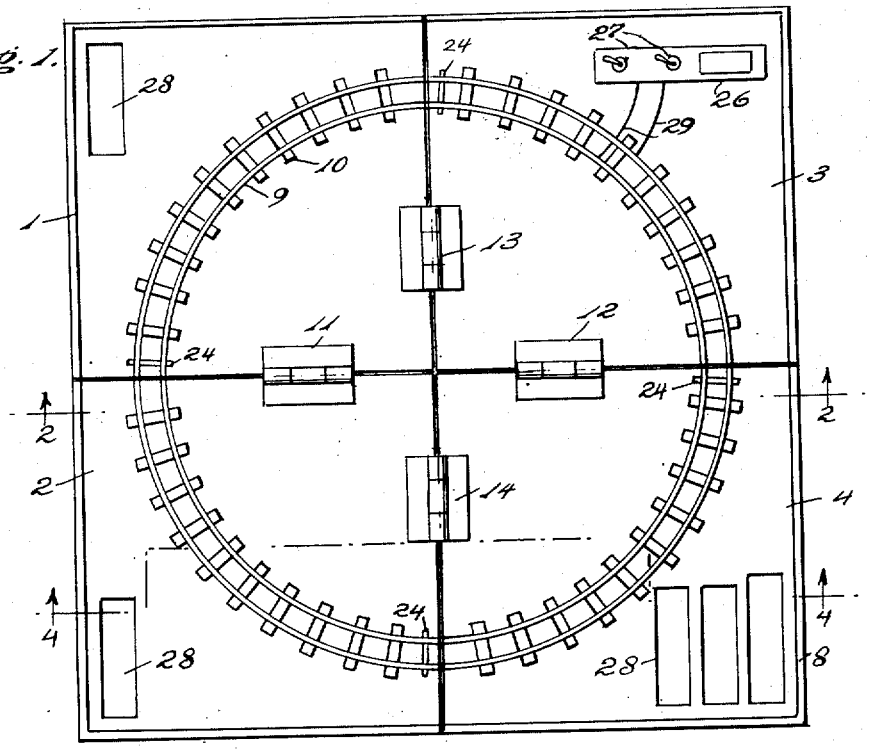
Figure 1 is a top plan view of a collapsible track unit embodying my invention.
Figure 2:
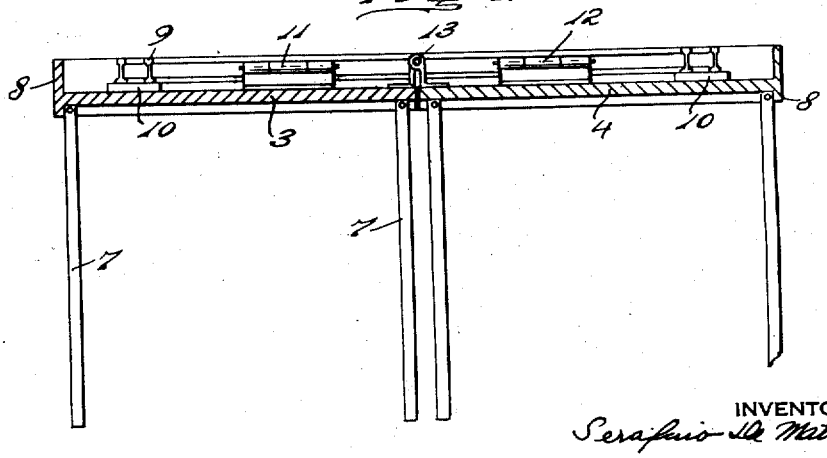
Figure 2 is a section on line 2—2 of Figure 1.
Figure 3:
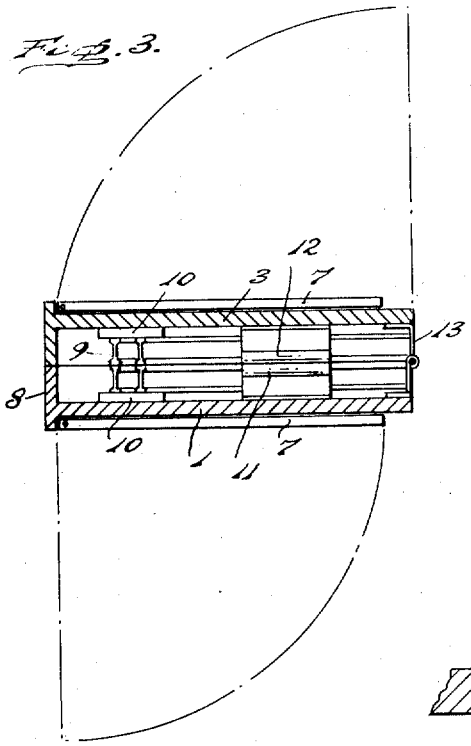
Figure 3 is a sectional view to two tables of the unit in a folded condition.
Figure 4:
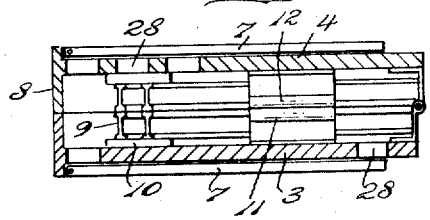
Figure 4 is a section of line 4—4 of Figure 1.
Figure 5:
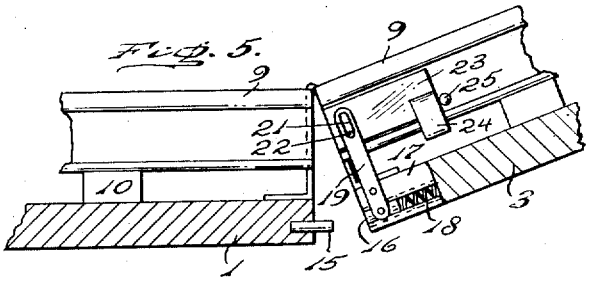
Figure 5 is a fragmentary view showing two hinged tables and electrical track connections in an open condition of the circuit.
Figure 6:
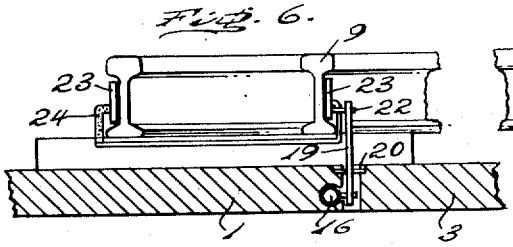
Figure 6 is a fragmentary view of two tables with the electrical track connections in circuit closing position.
Figure 7:
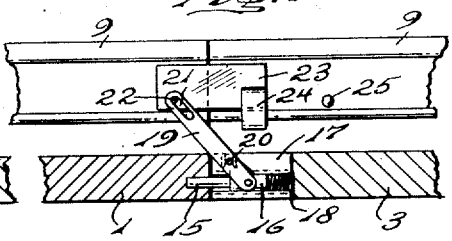
Figure 7 is a fragmentary section showing more particularly circuit controlling mechanism.
Figure 8:
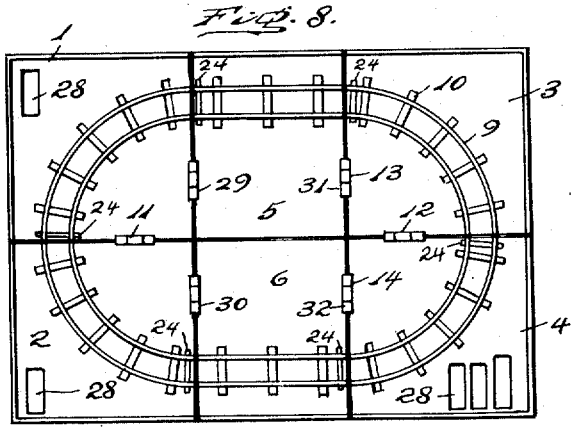
Figure 8 is a top plan view of a track unit having intermediate track carrying sections for extending the dimensions of the track.

Referring to the drawings:

As shown in Figure 1, I provide a plurality of tables 1, 2, 3 and 4, and in Figure 8 I have shown intermediate tables 5 and 6 for increasing the length of the track. Each table has legs 7 pivotally connected to it so that they can be folded up when the unit is not to be used.

The tables are preferably rectangular and their outer two sides when the tables are assembled as a unit have flanges or strips 8 extending above and below the table top.

Track segments 9 are mounted on insulating cross ties 10 so that the rails are insulated from each other and from the table.

The tables 1 and 2 are connected together by raised or offset hinges 11 and the tables 3 and 4 are hinged together by similar hinges 12. The tables 1 and 3 are hinged together by hinges 13 and the tables 2 and 4 by hinges 14. The hinges are of the piano type with removable pintles.

In order to maintain an electrical connection between the ends of juxtaposed rails, I provide novel means which are automatically operated when the tables are brought into horizontal alignment. A stud 15 carried by one table cooperates with a plunger 16 in a recess 17, the plunger being moved outwardly by a spring 18. A lever 19 pivoted at 20 is pivoted at one end to the plunger and is provided at its other end with a slot 21 into which a pin 22 extends, the pin being fixed to one of a pair of plates 23 which are connected by a bar 24. These plates slide in contact with the webs of juxtaposed rails. A stop 25 is provided to limit the movement of the plates in one direction. A transformer 26 adapted in the conventional manner to be connected with a source of electrical supply has switches 27 and conductors 29 leading to and from the two rails of the track. The tables may be provided with openings 28 to receive and position the engine and the cars when they are not in use.

In Figure 8, I have shown how the length of the tracks can be expanded by the additional tables 5 and 6 having hinge portions 30, 31, 32 and 29 to connect with the hinge portions of the tables 1, 2, 3 and 4, the tables being locked together in the manner already explained in connection with the other figures of the drawings.

In the operation, the tables are unfolded into a horizontal position as shown in Figure 1. As the tables come into their unfolded condition, the locking plungers cause the plates 23 to electrically connect the juxtaposed ends of rails of adjacent tables. The cross ties are of insulating material or are insulated from the table in the conventional manner.

When the track unit is not to be used, the table legs are folded up, the engines and cars positioned in the openings 28 and the tables 3 and 4 folded over the tables 1 and 2. The pintles of the hinges 11 and 12 may be removed, the table 3 folded over the table 1, and the table 4 folded over the table 2 and the tables assembled to form a package of minimum size for storing.

The bar 24 connecting the plates 23 is of insulating material.

Having thus described my invention, what I claim as new and desire to secure by Letters Patent is:

1. In a collapsible table for toy trains, a plurality of tables having foldable legs, a track segment having its rails mounted on each table and terminating near edges of the tables, plates contacting the rails near their ends on one of a pair of tables and movable to contact the rails near their ends on the other of the pair of tables, a plunger operatively connected with the plates, and a contact member on the other table of the pair to actuate said plunger during the unfolding movement of the tables and their movement to a horizontal position.

2. In a collapsible table for toy trains, a plurality of rectangular tables having foldable legs and arranged in pairs with each member of a pair of tables hinged together, and with the members of one pair hinged to members of the other pair, a track segment on each table terminating near edges of its table to form a substantially continuous track, contact plates engaging webs of a pair of rails, bars of insulating material connecting a pair of plates, a spring pressed plunger on one table of each pair, a lever for each plunger pivoted to its plunger and having a pin and slot connection with its bar, whereby said contact plates electrically connect juxtaposed ends of rails of the track when the tables are in a horizontal position by movement of said plungers.

*3. In a collapsible table for toy trains, tables arranged in pairs with the tables of a pair hinged together at adjacent sides and with adjacent pairs hinged together, said tables having foldable legs of uniform lengths and which when unfolded to support the tables horizontally aligns the tables, track segments having their rails mounted on the tables with their free ends terminating near the edges thereof and in horizontal alignment when the legs are unfolded and the tables are in horizontal alignment, elec-*

*trical connectors in longitudinally sliding contact with the rails of one of a pair of tables, and a tensioned plunger on the other table of a pair operatively connecting with the connector of its table pair to move it into electrical connection with the rails of the plunger carrying table during the unfolding of the tables to a horizontally aligned position.*

References Cited in the file of this patent or the original patent

UNITED STATES PATENTS

| | | |
|---|---|---|
| 1,776,262 | Le Noir et al. | Sept. 23, 1930 |
| 1,914,116 | Ford | June 13, 1933 |
| 2,198,306 | Fisher | Apr. 23, 1940 |
| 2,451,763 | Misko | Oct. 19, 1948 |
| 2,590,676 | Bradley | Mar. 25, 1952 |